(12) United States Patent
Tsay et al.

(10) Patent No.: US 7,015,658 B2
(45) Date of Patent: Mar. 21, 2006

(54) DRIVING CIRCUIT CONFIGURED IN A THREE-PHASE INVERTER AND DRIVING METHOD THEREOF

(75) Inventors: Chean-Lung Tsay, Hsinchu (TW); Chin-Chiang Yeh, Kaohsiung (TW)

(73) Assignee: Richtek Technology Corp., Hsinchu (TR)

( * ) Notice: Subject to any disclaimer, the term of this patent is extended or adjusted under 35 U.S.C. 154(b) by 139 days.

(21) Appl. No.: 10/743,916

(22) Filed: Dec. 24, 2003

(65) Prior Publication Data

US 2004/0136215 A1    Jul. 15, 2004

(30) Foreign Application Priority Data

Dec. 30, 2002    (TW) .............................. 91137941 A

(51) Int. Cl.
*H05B 41/36* (2006.01)
*H02M 7/537* (2006.01)

(52) U.S. Cl. ..................... 315/307; 363/131

(58) Field of Classification Search ............. 315/169.3, 315/169.4, 307, DIG. 4; 345/45, 47, 76, 345/87, 102, 105; 363/131
See application file for complete search history.

(56) References Cited

U.S. PATENT DOCUMENTS

| | | | |
|---|---|---|---|
| 6,396,722 B1 * | 5/2002 | Lin | 363/98 |
| 6,750,842 B1 * | 6/2004 | Yu | 345/102 |
| 2001/0036094 A1 * | 11/2001 | Strand et al. | 363/65 |
| 2004/0080282 A1 * | 4/2004 | Block et al. | 315/241 S |

* cited by examiner

*Primary Examiner*—Trinh Vo Dinh
*Assistant Examiner*—Minh Dieu A
(74) *Attorney, Agent, or Firm*—Rosenberg, Klein & Lee

(57) ABSTRACT

In a three-phase inverter configured driving circuit and method, three switch assemblies are connected in parallel between an input voltage and a reference voltage and switched to generate a three-phase AC voltage on the primary side of a three-phase transformer, so as to be transformed to a three-phase current from the secondary side of the transformer to provide for three loadings.

14 Claims, 6 Drawing Sheets

US 7,015,658 B2

DRIVING CIRCUIT CONFIGURED IN A THREE-PHASE INVERTER AND DRIVING METHOD THEREOF

FIELD OF THE INVENTION

The present invention relates generally to a driving circuit, and more particularly, to a driving circuit and method for three-phase cold cathode fluorescent lamps (CCFL).

BACKGROUND OF THE INVENTION

CCFL has been widely used for the backlight of display, especially the liquid crystal display (LCD), due to its advantages of power saving, low power dissipation, decreased heat generation, long life time, small size, light weight, high illumination, high color rendering, and moderate lamp temperature after long-term used. Conventionally, it is sufficient of only one CCFL for a display, because of the small size of the display. As the progress in technology, however, the display becomes larger and therefore the amount of the CCFLs served as the light source has to be increased. Thus, there is a need for a driving circuit capable of driving several CCFLs.

A driving circuit proposed by U.S. Pat. No. 6,396,722 issued to Lin comprises four MOS transistors and one transformer to be constituted a full-bridge circuit to drive CCFL. However, only one CCFL could be driven by this circuit, and several such individual full-bridge circuits are needed if several CCFLs to be driven. Further, due to the fact that MOS transistor and transformer are all costly elements, the more ones being used, the cost is higher.

Therefore, it is desired a driving circuit capable of driving several CCFLs with a reduced cost.

SUMMARY OF THE INVENTION

It is an object of the present invention to disclose a driving circuit and method that employs a three-phase inverter configuration for driving a plurality of CCFLs.

It is another object of the present invention to propose a driving circuit and method capable of driving a plurality of CCFLs with reduced cost.

In a driving circuit configured in a three-phase inverter, according to the present invention, it is comprised a first switch assembly including a first high-side switch connected between an input voltage and a first node, and a first low-side switch connected between the first node and a reference voltage, a second switch assembly including a second high-side switch connected between the input voltage and a second node, and a second low-side switch connected between the second node and reference voltage, a third switch assembly including a third high-side switch connected between the input voltage and a third node, and a third low-side switch connected between the third node and reference voltage, and a three-phase transformer with three terminals of its primary side connected to the three nodes, respectively, and three terminals of its secondary side connected to three loadings, respectively. The switches are switched to generate a first AC voltage between the first and second nodes, a second AC voltage between the second and third nodes, and a third AC voltage between the third and first nodes, respectively. The three AC voltages are further transformed to three AC currents by the three-phase transformer to provide for the three loadings, and each of them includes at least one CCFL to be driven by the AC current flowing therethrough.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
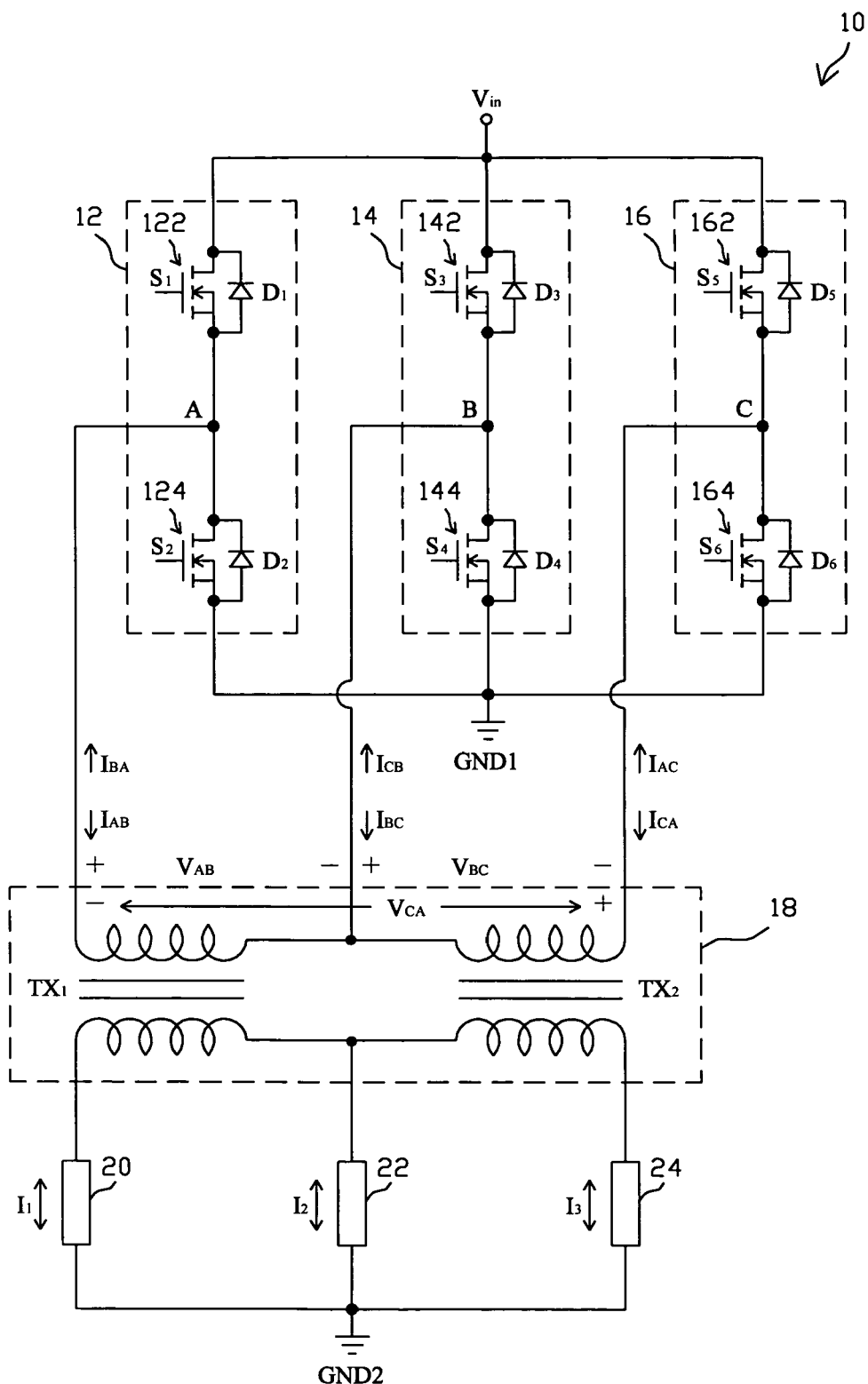
FIG. 1 shows a driving circuit configured in a three-phase inverter according to the present invention.

FIG. 1 shows a preferred embodiment of a driving circuit 10 configured in a three-phase inverter, which comprises a switch assembly 12 connected between an input voltage $V_{in}$ and ground GND1, and including a high-side NMOS transistor 122 connected between the input voltage $V_{in}$ and node A, and a low-side NMOS transistor 124 connected between the node A and ground GND1. Likewise, another switch assembly 14 is connected between the input voltage $V_{in}$ and ground GND1, and includes a high-side NMOS transistor 142 connected between the input voltage $V_{in}$ and node B, and a low-side NMOS transistor 144 connected between the node B and ground GND1, and a third switch assembly 16 is connected between the input voltage $V_{in}$ and ground GND1, and includes a high-side NMOS transistor 162 connected between the input voltage $V_{in}$ and node C, and a low-side NMOS transistor 164 connected between the node C and ground GND1. In addition, six diodes $D_1$–$D_6$ are connected in parallel to the six NMOS transistors 122–164, respectively, and a three-phase transformer 18 including two transformers $TX_1$ and $TX_2$ connected in series has its primary side connected to the nodes A, B and C, and its secondary side connected with three CCFLs 20, 22 and 24 between thereto and ground GND2. All the NMOS transistors 122, 124, 142, 144, 162, and 164 are provided for switches each under the control of one of the signals $S_1$, $S_2$, $S_3$, $S_4$, $S_5$, and $S_6$.

Figure 2:
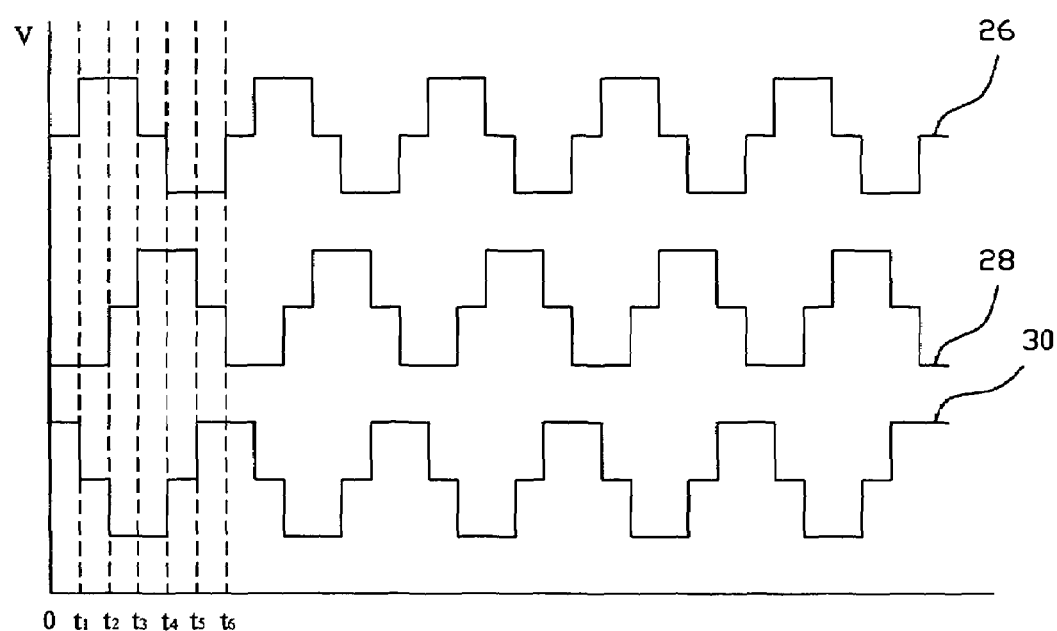
FIG. 2 shows a timing diagram of the waveforms of the voltages between the nodes A and B, B and C, and C and A, respectively, of the circuit shown in FIG. 1.

FIG. 2 shows waveforms 26, 28, and 30 for the voltages $V_{AB}$ between the nodes A and B, $V_{BC}$ between the nodes B and C, as well as $V_{CA}$ between the nodes C and A, respectively, of the circuit shown in FIG. 1, where the phases of these three AC voltages are displaced from each other by 120 degrees. In conjunction of referring to FIG. 1, in the operation of the circuit 10, the transistors 122, 144, and 162 are turned on to conduct currents $I_{AB}$, $I_{CB}$ and $I_{CA}$ during the time period of 0 to $t_1$, the transistors 122, 144, and 164 are turned on to conduct currents $I_{AB}$, $I_{CB}$ and $I_{AC}$ during the time period of $t_1$ to $t_2$, the transistors 122, 142, and 164 are turned on to conduct currents $I_{AB}$, $I_{BC}$ and $I_{AC}$ during the time period of $t_2$ to $t_3$, the transistors 124, 142, and 164 are turned on to conduct currents $I_{BA}$, $I_{BC}$ and $I_{AC}$ during the time period of $t_3$ to $t_4$, the transistors 124, 142, and 162 are turned on to conduct currents $I_{BA}$, $I_{BC}$ and $I_{CA}$ during the time period of $t_4$ to $t_5$, and the transistors 124, 144, and 162 are turned on to conduct currents $I_{BA}$, $I_{CB}$ and $I_{CA}$ during the time period of $t_5$ to $t_6$. As such, the AC voltage $V_{AB}$ between the nodes A and B, the AC voltage $V_{BC}$ between the nodes B and C, and the AC voltage $V_{CA}$ between the nodes C and A are transformed by the three-phase transformer 18 to AC currents $I_1$, $I_2$ and $I_3$ to flow through the CCFLs 20, 22 and 24, respectively. From one point of view, systematically, the three AC voltages $V_{AB}$, $V_{BC}$ and $V_{CA}$ form a three-phase voltage, and the three AC currents $I_1$, $I_2$ and $I_3$ form a three-phase current, since dependence is presented between the three phases.

Figure 3:
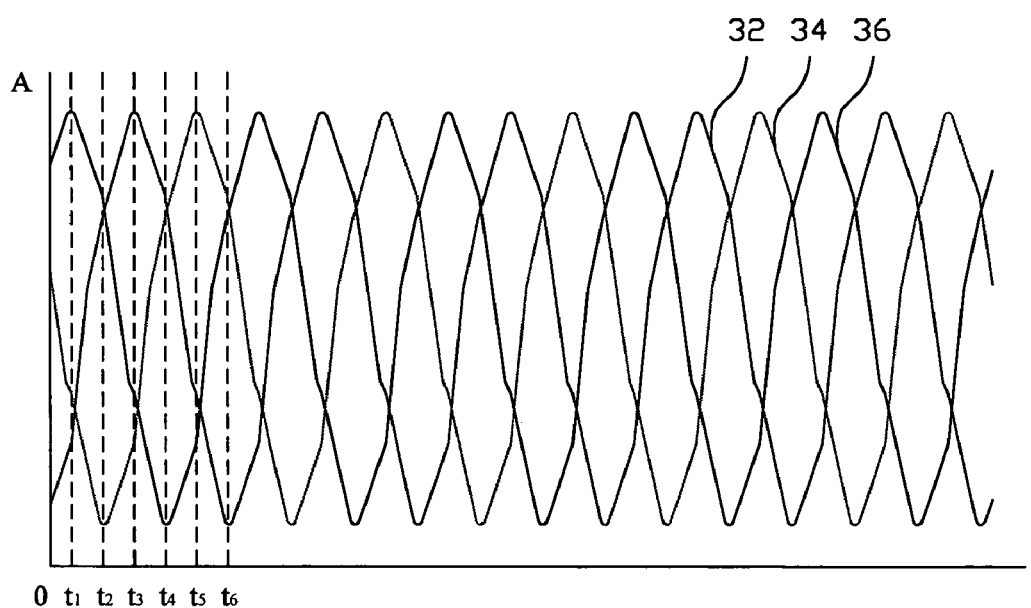
FIG. 3 shows a timing diagram of the waveforms of the currents flowing through three CCFLs of the circuit shown in FIG. 1.

From FIG. 2, obviously, each time interval, for example from 0 to $t_1$, equals to ⅙ cycle since from 0 to $t_6$ is a complete cycle, and thus, the voltage waveforms 26, 28 and 30 of this embodiment are displaced from each other by 120 degrees in phase. On the other hand, the waveforms 32, 34 and 36 shown in FIG. 3 represent the AC current waveforms $I_1$, $I_2$, and $I_3$ of the circuit 10 shown in FIG. 1. As in the afore-mentioned operation, the phases of the current waveforms 32, 34 and 36 are also displaced from each other by 120 degrees.

A typical three-phase transformer is constituted by three transformers. However, decreasing of one transformer has no effect on the generation of the three-phase current according to the principle of the three-phase circuit. For the purpose of cost reduction, two transformers $TX_1$ and $TX_2$ are preferred to be connected in series to constitute the three-phase transformer 18. For comparison, the driving circuit proposed by the '722 patent needs three sets of substantially equivalent full-bridge driving circuits and as a result, twelve NMOS transistors and three transformers are needed. In contrast, there needs only six NMOS transistors as well as two transformers for the circuit 10 to drive three CCFLs, which is less than the conventional driving circuit by six NMOS transistors as well as one transformer, resulting in dramatic reduction of cost.

Figure 4:
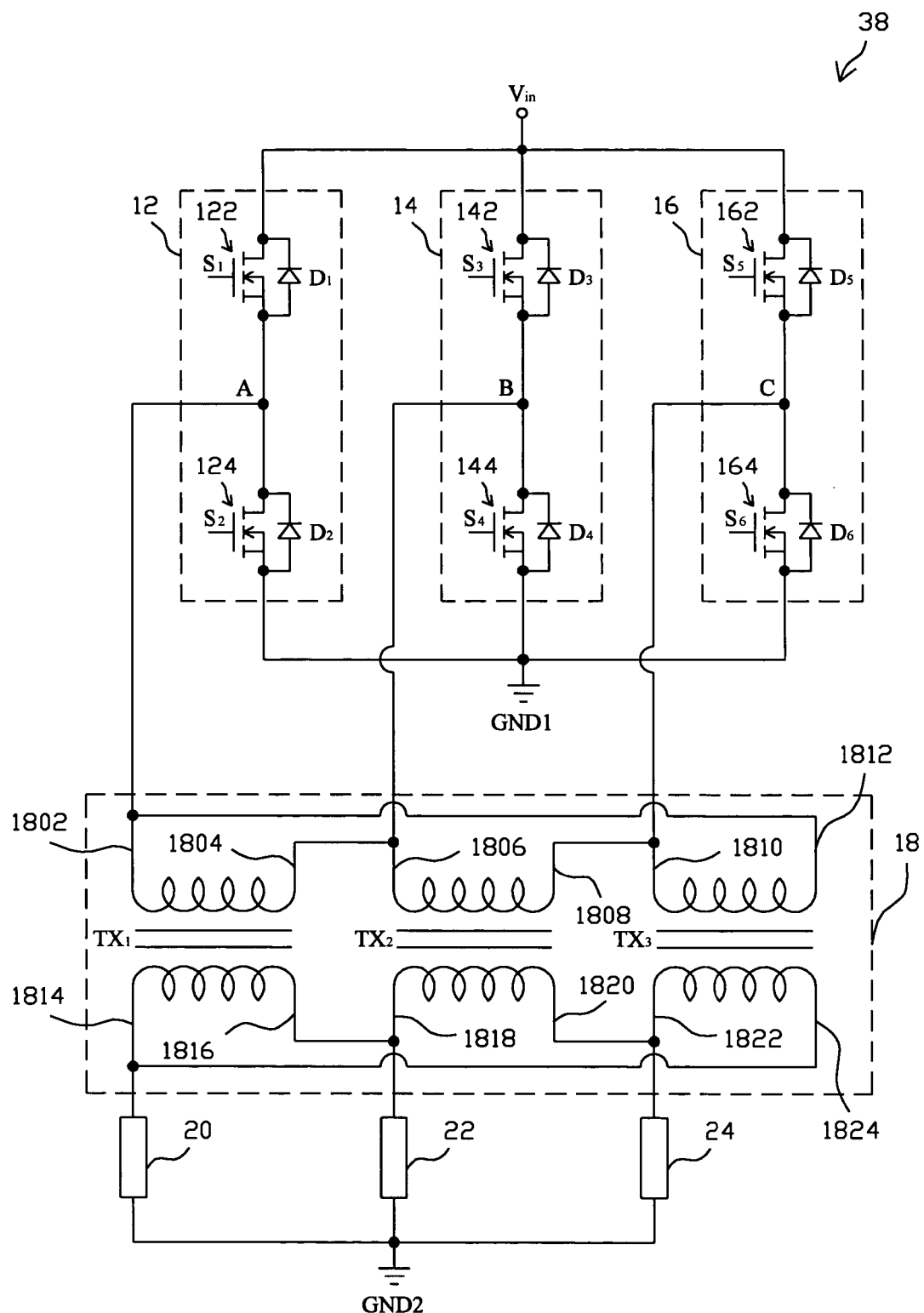
FIG. 4 shows another embodiment driving circuit according to the present invention.

FIG. 4 is a second embodiment of the present invention. The driving circuit 38 hereof is similar to the previous driving circuit 10, except that the three-phase transformer 18 has a Δ—Δ configuration instead, i.e., the three-phase transformer 18 is constituted by three transformers $TX_1$, $TX_2$ and $TX_3$ connected in Δ—Δ configuration. The connection 1804 at the primary side of the transformer $TX_1$ is connected to the terminal 1806 at the primary side of the transformer $TX_2$, the other terminal 1808 at the primary side of the transformer $TX_2$ is connected to the terminal 1810 at the primary side of the transformer $TX_3$, the other terminal 1812 at the primary side of the transformer $TX_3$ is connected to the connection 1802 at the primary side of the transformer $TX_1$. While the connection 1816 at the secondary side of the transformer $TX_1$ is connected to the terminal 1818 at the secondary side of the transformer $TX_2$, the other terminal 1820 at the secondary side of the transformer $TX_2$ is connected to the terminal 1822 at the secondary side of the transformer $TX_3$, the other terminal 1824 at the secondary side of the transformer $TX_3$ is connected to the connection 1814 at the secondary side of the transformer $TX_1$. Further, the connections 1802, 1806 and 1810 are connected to the nodes A, B and C, respectively, and the connections 1814, 1818 and 1822 are connected to the CCFLs 20, 22 and 24, respectively. This manner, it is obtained the cost reduction of decreasing six NMOS transistors.

Figure 5:
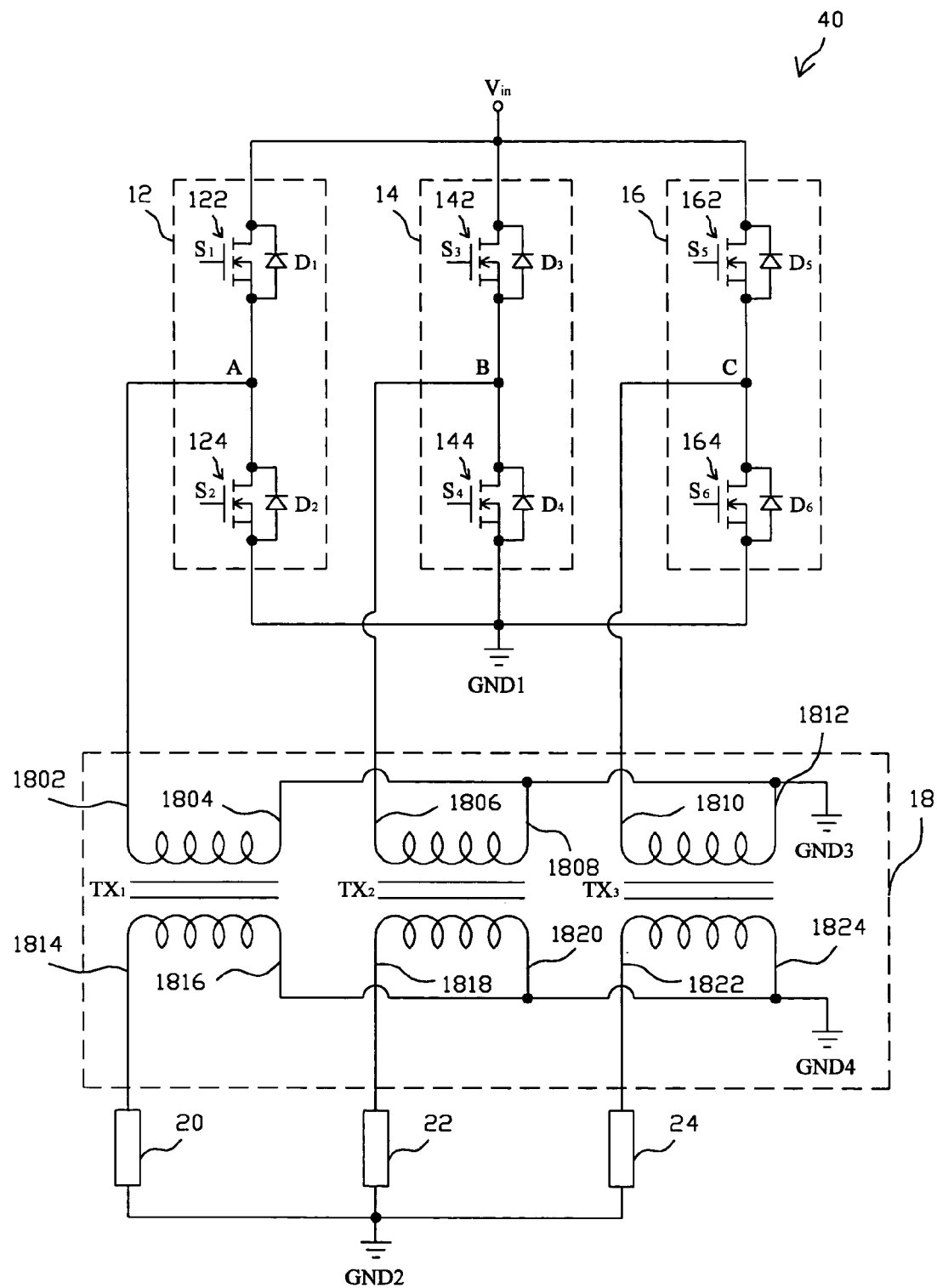
FIG. 5 shows a further embodiment driving circuit according to the present invention.

FIG. 5 shows a third embodiment of the present invention. The driving circuit 40 is also similar to the circuit 38, except that the three-phase transformer 18 has a Y—Y connection instead, i.e., the three-phase transformer 18 is constituted by three transformers $TX_1$, $TX_2$ and $TX_3$ connected in Y—Y configuration. The terminals 1802, 1806 and 1810 at the primary sides of the transformers $TX_1$, $TX_2$ and $TX_3$ are connected to the nodes A, B and C, respectively, and the other terminals 1804, 1808 and 1812 of them are connected to ground GND3. While the terminals 1814, 1818 and 1822 at the secondary sides of the transformers $TX_1$, $TX_2$ and $TX_3$ are connected to the CCFLs 20, 22 and 24, respectively, and the other terminals 1816, 1820 and 1824 are connected to ground GND4. It is also obtained in this circuit 40 with the cost reduction of decreasing six NMOS transistors, as for the driving circuit 38.

Figure 6:
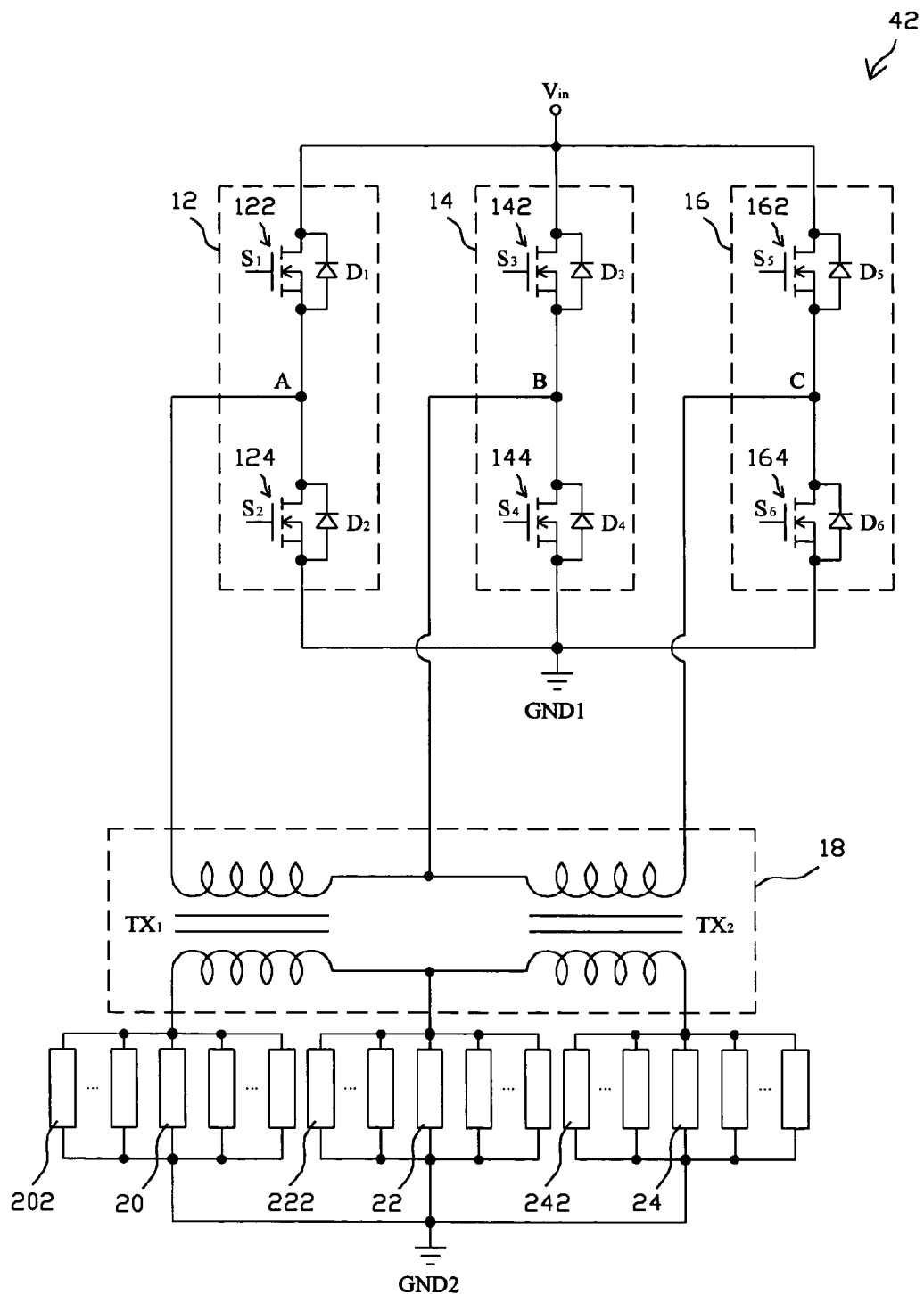
FIG. 6 shows an application of the driving circuit according to the present invention.

If more than three CCFLs are to be driven, the CCFLs 202, 222 and 242 of the circuits 10, 38 or 40 could be connected in parallel with other CCFLs, and FIG. 6 shows an exemplatory circuit 42 for such situations.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A driving circuit configured in a three-phase inverter, comprising:
    a first switch assembly including a first high-side switch connected between an input voltage and a first node, and a first low-side switch connected between said first node and a reference voltage;
    a second switch assembly including a second high-side switch connected between said input voltage and a second node, and a second low-side switch connected between said second node and said reference voltage;
    a third switch assembly including a third high-side switch connected between said input voltage and a third node, and a third low-side switch connected between said third node and said reference voltage; and
    a three-phase transformer having a primary side with three terminals connected with said first, second and third nodes, respectively, and a secondary side with three terminals connected with a first, second and third loadings, respectively;
    wherein said switches are switched for generating a first AC voltage between said first and second nodes, a second AC voltage between said second and third nodes, and a third AC voltage between said third and first nodes, respectively, so as to be transformed by said three-phase transformer to generate a first AC current for said first loading, a second AC current for said second loading, and a third AC current for said third loading, respectively.

2. The driving circuit according to claim 1, wherein said three-phase transformer comprises two transformers connected in series.

3. The driving circuit according to claim 1, wherein said three-phase transformer comprises three transformers connected in Y—Y configuration.

4. The driving circuit according to claim 1, wherein said three-phase transformer comprises three transformers connected in Δ—Δ configuration.

5. The driving circuit according to claim 1, wherein said three AC voltages have a phase difference of 120 degrees between each two of them.

6. The driving circuit according to claim 1, wherein said three AC currents have a phase difference of 120 degrees between each two of them.

7. The driving circuit according to claim 1, wherein said switches each is connected with a diode in parallel.

8. The driving circuit according to claim 1, wherein said switches each comprises an NMOS transistor.

9. The driving circuit according to claim 1, wherein said input voltage is a DC voltage.

10. The driving circuit according to claim 1, wherein said three loadings each includes at least one cold cathode fluorescent lamp.

11. A driving method comprising the steps of:
 connecting a first switch assembly including a first high-side and low-side switches connected in series between an input voltage and a reference voltage;
 connecting a second switch assembly including a second high-side and low-side switches connected in series between said input voltage and reference voltage;
 connecting a third switch assembly including a third high-side and low-side switches connected in series between said input voltage and reference voltage;
 switching said high-side and low-side switches for generating three AC voltages; and
 transforming said three AC voltages to three AC currents each for one of three loadings.

12. The method according to claim 11, further comprising modulating said three AC voltages to have a phase difference of 120 degrees between each two of them.

13. The method according to claim 11, further comprising modulating said three AC currents to have a phase difference of 120 degrees between each two of them.

14. The method according to claim 11, further comprising driving at least one cold cathode fluorescent lamp by each of said three AC currents.

\* \* \* \* \*